US009478102B2

(12) United States Patent
Jaffe et al.

(10) Patent No.: US 9,478,102 B2
(45) Date of Patent: Oct. 25, 2016

(54) WAGERING GAME WITH ALTERABLE-MATH FEATURE

(75) Inventors: Joel R. Jaffe, Glenview, IL (US); Michael P. Casey, Chicago, IL (US); Jeffrey M. Lichtman, Highland Park, IL (US)

(73) Assignee: Bally Gaming, Inc., Las Vegas, NV (US)

(*) Notice: Subject to any disclaimer, the term of this patent is extended or adjusted under 35 U.S.C. 154(b) by 2571 days.

(21) Appl. No.: 11/253,173

(22) Filed: Oct. 18, 2005

(65) Prior Publication Data

US 2006/0084496 A1 Apr. 20, 2006

Related U.S. Application Data

(60) Provisional application No. 60/620,499, filed on Oct. 20, 2004.

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |

(52) U.S. Cl.
CPC ....... *G07F 17/3239* (2013.01); *G07F 17/3244* (2013.01); *G07F 17/3269* (2013.01)

(58) Field of Classification Search
CPC ............. G07F 17/3244; G07F 17/326; G07F 17/3267
USPC ............................................... 463/16, 20, 43
See application file for complete search history.

(56) References Cited

U.S. PATENT DOCUMENTS

| | | | | |
|---|---|---|---|---|
| 4,752,068 A | | 6/1988 | Endo | 273/1 E |
| 5,575,474 A | | 11/1996 | Rossides | 463/26 |
| 5,609,525 A | | 3/1997 | Ohno et al. | 463/43 |
| 5,833,537 A | | 11/1998 | Barrie | 463/21 |
| 5,957,775 A | | 9/1999 | Cherry | 463/16 |
| 6,004,211 A | | 12/1999 | Brenner et al. | 463/40 |
| 6,012,045 A | | 1/2000 | Barzilai | 705/37 |
| 6,012,983 A | | 1/2000 | Walker et al. | 463/20 |
| 6,015,344 A | | 1/2000 | Kelly et al. | 463/16 |
| 6,068,552 A | * | 5/2000 | Walker et al. | 463/21 |
| 6,077,163 A | | 6/2000 | Walker et al. | 463/26 |
| 6,113,098 A | | 9/2000 | Adams | 273/143 R |

(Continued)

FOREIGN PATENT DOCUMENTS

| | | | |
|---|---|---|---|
| WO | WO 99/29381 | 6/1999 | A63F 7/00 |
| WO | WO 2005/082480 A1 | 9/2005 | |

(Continued)

*Primary Examiner* — Milap Shah
*Assistant Examiner* — Jason Pinheiro
(74) *Attorney, Agent, or Firm* — Nixon Peabody LLP

(57) ABSTRACT

A method for playing a wagering game includes receiving wager inputs from a player for a wagering game. A randomly-selected outcome is selected from a plurality of outcomes in response to receiving the wager inputs. The selecting of the randomly-selected outcome is determined in accordance with a gaming math feature. A data set representing a game-play characteristic is stored before discontinuing game-play in a gaming session. In response to the player continuing the wagering game in a subsequent gaming session, the data set is accessed. The gaming math feature for the wagering game in the subsequent gaming session is altered based on the game-play characteristic.

13 Claims, 10 Drawing Sheets

(56) References Cited

U.S. PATENT DOCUMENTS 6,165,071 A 12/2000 Weiss .............................. 463/24
6,234,896 B1 5/2001 Walker et al. .................. 463/16
6,254,481 B1 7/2001 Jaffe ............................... 463/20
6,254,483 B1 7/2001 Acres .............................. 463/26
6,273,820 B1 8/2001 Haste, III ........................ 463/40
6,302,790 B1 10/2001 Brossard ......................... 463/20
6,311,976 B1 11/2001 Yoseloff et al. .............. 273/138
6,319,127 B1 11/2001 Walker et al. .................. 463/26
6,364,765 B1 4/2002 Walker et al. .................. 463/16
6,365,765 B1 4/2002 Baldwin et al. .............. 556/440
6,431,983 B2 8/2002 Acres .............................. 463/25
6,506,117 B2 1/2003 DeMar ............................ 463/20
6,506,118 B1 1/2003 Baerlocher et al. ............ 463/25
6,632,140 B2 * 10/2003 Berman et al. ................. 463/18
6,663,489 B2 12/2003 Baerlocher ..................... 463/20
6,722,981 B2 4/2004 Kaminkow ..................... 463/20
6,722,985 B2 4/2004 Criss-Puszkiewicz et al. ............................... 463/29
6,745,236 B1 6/2004 Hawkins et al. ............. 709/203
6,758,757 B2 7/2004 Luciano, Jr. et al. .......... 463/43
6,776,713 B2 8/2004 Gauselmann ................... 463/16
6,780,111 B2 8/2004 Cannon et al. ................. 463/25
6,800,027 B2 10/2004 Giobbi et al. .................. 463/24
6,811,486 B1 11/2004 Luciano, Jr. .................... 463/24
6,923,721 B2 8/2005 Luciano et al. ................ 463/24
7,182,690 B2 2/2007 Giobbi et al. .................. 463/24
2001/0024971 A1 9/2001 Brossard ......................... 463/30
2001/0046893 A1 11/2001 Giobbi et al. .................. 463/24
2002/0028708 A1 3/2002 Busch et al. .................... 463/42
2002/0039919 A1 4/2002 Joshi et al. ..................... 463/20
2002/0077173 A1 6/2002 Luciano, Jr. et al. .......... 463/23
2002/0077174 A1 6/2002 Luciano et al. ................ 463/25
2002/0082075 A1 * 6/2002 Meyer ............................. 463/20
2002/0093136 A1 7/2002 Moody ......................... 273/139
2002/0094871 A1 7/2002 Luciano, Jr. et al. .......... 463/43
2002/0107065 A1 8/2002 Rowe .............................. 463/20
2002/0151349 A1 10/2002 Joshi ............................... 463/20
2002/0196342 A1 12/2002 Walker et al. ................ 348/157
2003/0013515 A1 1/2003 Rowe et al. .................... 463/25
2003/0013531 A1 1/2003 Rowe et al. .................... 463/42
2003/0036422 A1 2/2003 Baerlocher et al. ............ 463/20
2003/0036427 A1 2/2003 Brandstetter et al. .......... 463/29
2003/0064794 A1 4/2003 Mead et al. .................... 463/25
2003/0078101 A1 * 4/2003 Schneider et al. .............. 463/42
2003/0100362 A1 5/2003 Horniak et al. ................ 463/25
2003/0106769 A1 6/2003 Weiss .............................. 463/21
2003/0114219 A1 6/2003 McClintic ....................... 463/25
2003/0119579 A1 6/2003 Walker et al. .................. 463/20
2003/0157979 A1 8/2003 Cannon et al. ................. 463/16
2003/0195024 A1 10/2003 Slattery ............................. 463/9
2003/0211881 A1 11/2003 Walker et al. .................. 463/20
2004/0053680 A1 3/2004 Schultz ........................... 463/20
2004/0142742 A1 7/2004 Schneider et al. .............. 463/25
2004/0162129 A1 * 8/2004 Nelson ............................ 463/16
2004/0259627 A1 * 12/2004 Walker et al. .................. 463/20
2005/0003886 A1 1/2005 Englman et al. ............... 463/25
2005/0159207 A1 7/2005 Thomas .......................... 463/20
2006/0068893 A1 3/2006 Jaffe et al. ...................... 463/20
2006/0079316 A1 4/2006 Flemming et al. ............. 463/25
2006/0079317 A1 4/2006 Flemming et al. ............. 463/20
2006/0084495 A1 4/2006 Jaffe et al. ...................... 463/20
2006/0089194 A1 4/2006 Joshi et al. ..................... 463/25

FOREIGN PATENT DOCUMENTS

WO WO 2006/002241 A2 1/2006
WO WO 2006/004831 A2 1/2006
WO WO 2006/004832 A2 1/2006
WO WO 2006/005073 A2 1/2006
WO WO 2006/017036 A1 2/2006
WO WO 2006/017067 A1 2/2006
WO WO 2006/017068 A1 2/2006
WO WO 2006/020811 A2 2/2006
WO WO 2006/026250 A2 3/2006
WO WO 2006/044252 A2 4/2006

* cited by examiner

Alter Volatility Over Time

| Gaming Sessions | Basegame Pays | | Bonus Rounds | |
|---|---|---|---|---|
| | Award | Frequency | Award | Frequency |
| 1 - 5 | 2-3 x Wager | Once / 10 Games | 7-10 x Wager | Once / 30 Games |
| 6 -10 | 3-4 x Wager | Once / 15 Games | 7-50 x Wager | Once / 60 Games |
| 11 - 20 | 5-7 x Wager | Once / 20 Games | 7-100 x Wager | Once / 120 Games |

Fig. 3A

Adjust Payback Percentage Over Time

| Gaming Sessions | Payback Percentage | Payback Amount | Payback Frequency | Higher Paying Symbols | Bonus Reel Symbols |
|---|---|---|---|---|---|
| 1 - 5 | 86% | 20 Credits | 35% | 1 / Reel | 1 / Reel |
| 6 -10 | 88% | 30 Credits | 40% | 2 / Reel | 2 / Reel |
| 11 - 20 | 90% | 40 Credits | 45% | 3 / Reel | 3 / Reel |
| 21 - 40 | 94% | 50 Credits | 50% | 4 / Reel | 4 / Reel |

Fig. 4A

WAGERING GAME WITH ALTERABLE-MATH FEATURE

RELATED APPLICATIONS

This application is related to and claims priority to U.S. Provisional Patent Application Ser. No. 60/620,499 filed Oct. 20, 2004, titled "Wagering Game With Alterable-Math Feature," which is incorporated herein in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming terminals for playing a wagering game and, more particularly, to a gaming terminal having a math feature that changes over a game-play characteristic, such as elapsed game time.

BACKGROUND OF THE INVENTION

Gaming machines, such as slot machines, video poker machines, and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning each machine is roughly the same (or believed to be the same), players are most likely to be attracted to the most entertaining and exciting of the machines.

Consequently, shrewd operators strive to employ the most entertaining and exciting machines available because such machines attract frequent play and, hence, increase profitability to the operator. In the competitive gaming machine industry, there is a continuing need for gaming machine manufacturers to produce new types of games, or enhancements to existing games, which will attract frequent play by enhancing the entertainment value and excitement associated with the game.

One concept that has been successfully employed to enhance the entertainment value of a game is that of a "bonus" game which may be played in conjunction with a "basic" game. The bonus game may comprise any type of game, either similar to or completely different from the basic game, and is entered upon the occurrence of a selected event or outcome of the basic game. Such a bonus game produces a significantly higher level of player excitement than the basic game because it provides a greater expectation of winning than the basic game.

Another concept that has been employed is the use of a progressive jackpot. In the gaming industry, a "progressive" involves collecting coin-in data from participating gaming device(s) (e.g., slot machines), contributing a percentage of that coin-in data to a jackpot amount, and awarding that jackpot amount to a player upon the occurrence of a certain jackpot-won event. The percentage of the coin-in is determined prior to any result being achieved and is independent of any result. A jackpot-won event typically occurs when a "progressive winning position" is achieved at a participating gaming device. If the gaming device is a slot machine, a progressive winning position may, for example, correspond to alignment of progressive jackpot reel symbols along a certain payline. The initial progressive jackpot is a predetermined minimum amount. That jackpot amount, however, progressively increases as players continue to play the gaming machine without winning the jackpot. Further, when several gaming machines are linked together such that several players at several gaming machines compete for the same jackpot, the jackpot progressively increases at a much faster rate, which leads to further player excitement.

In current basic games, bonus games, and progressive games, the player is provided with little incentive to return the game at a later time. Once the player chooses to stop playing the game in that round, the player is immediately awarded any credits that are remaining and also loses assets that have been accumulated, but not yet awarded. For example, in some games, the bonus game consists of the player collecting assets and when a certain number or combination of assets is accumulated, the player wins an award. However, should the player choose to leave the game prior to winning the award, the player loses all of the assets accumulated. This can cause player frustration and does not provide the player with any incentive to return to the game.

Such a system also encourages "vulturing," in which the "vulturing" player waits for a person who is close to winning an award to leave the gaming machine prior to the winning of the award. The "vulturing" player then begins to play the machine, and may quickly win the award without investing much time into the game. This is also frustrating for other players.

Thus, there is a need to allow a player to accumulate assets on gaming terminals and to have those assets restored to them should the player return to the game at a later time. This way, should a player choose to leave a game, anything the player has accumulated during the game goes with them and is restored at a later time when the player returns to the game. This alleviates the player frustration at losing assets that they have accumulated and also provides the player an incentive to return to the game at a later date.

Another need is directed to varying a player's gaming experience by changing, or altering, the math of a gaming terminal. For example, if the player has a losing streak during an initial gaming session, the gaming math can be changed in a subsequent gaming session to encourage the player and to provide a more entertaining gaming experience. Thus, the player's prior playing history can be used to determine an appropriate gaming math for the player.

Yet another need is directed to enhancing a player's gaming experience by providing different types of awards during different gaming sessions. For example, while smaller and more frequent awards can be awarded during an initial gaming session, larger and less frequent awards can be awarded during subsequent gaming session. A solution such as changing the type of award, as mentioned above, can make the gaming experience more exciting and more entertaining.

SUMMARY OF THE INVENTION

A method for playing a wagering game includes receiving wager inputs from a player for a wagering game. A randomly-selected outcome is selected from a plurality of outcomes in response to receiving the wager inputs. The selecting of the randomly-selected outcome is determined in accordance with a gaming math feature. A data set representing a game-play characteristic is stored before discontinuing game-play in a gaming session. In response to the player continuing the wagering game in a subsequent gaming session, the data set is accessed. The gaming math feature for the wagering game in the subsequent gaming session is altered based on the game-play characteristic.

In another aspect of the present invention, a gaming system for playing a wagering game includes a display and a controller coupled to the display. The display is for displaying a randomly-selected outcome of a plurality of outcomes in response to accepting wager inputs from a player. The randomly-selected outcome is being determined in accordance with a gaming math feature. The controller is programmed to store a data set, which represents a game-play characteristic, before discontinuing game-play in a gaming session. The game-play characteristic is associated with the player. The data set is accessed in response to the player continuing the wagering game in a subsequent gaming session. The gaming math feature for the wagering game in the subsequent gaming session is altered based on the game-play characteristic.

In an alternative aspect of the present invention, a method for conducting a wagering game includes receiving a wager input from a player for playing a wagering game, wherein the wagering game is conducted over a plurality of gaming sessions including a first gaming session and a second gaming session, which occurs after the first gaming session. A randomly-selected outcome is selected, in accordance with a gaming math feature, from a plurality of outcomes in response to receiving the wager input. A data set is saved to represent a state of a game-play characteristic in the first gaming session. The state of the game-play characteristic is updated in the second gaming session based on activity of the player in the second gaming session. While the player is playing the wagering game in the second gaming session, the gaming math feature is changed based on the updated state of the game-play characteristic.

In an alternative aspect of the present invention, a method for conducting a wagering game includes receiving a wager input from a player for playing a wagering game. A first randomly-selected outcome is selected from a plurality of outcomes in response to receiving the wager input. The selecting of the first randomly-selected outcome is determined in accordance with a first gaming math feature, in a first gaming session of the wagering game. The first gaming math feature is based on a state of a game-play characteristic. A data set is stored to represent the state of the game-play characteristic after the first gaming session. The state of the game-play characteristic is changed to an updated state in a second gaming session of the wagering game. In the second gaming session, in response to the receiving step, a second randomly-selected outcome is selected from the plurality of outcomes. The selecting of the second randomly-selected outcome is determined in accordance with a second gaming math feature, in the second gaming session of the wagering game. The second gaming math feature is based on the updated state of the game-play characteristic.

The above summary of the present invention is not intended to represent each embodiment, or every aspect, of the present invention. Additional features and benefits of the present invention are apparent from the detailed description, figures, and claims set forth below.

BRIEF DESCRIPTION OF THE FIGURES

FIG. 3A is a table representing a change in volatility over time, according to another embodiment of the present invention.

FIG. 4A is a table representing an adjustment in payback percentage over time, according to an alternative embodiment of the present invention.

Figure 1:
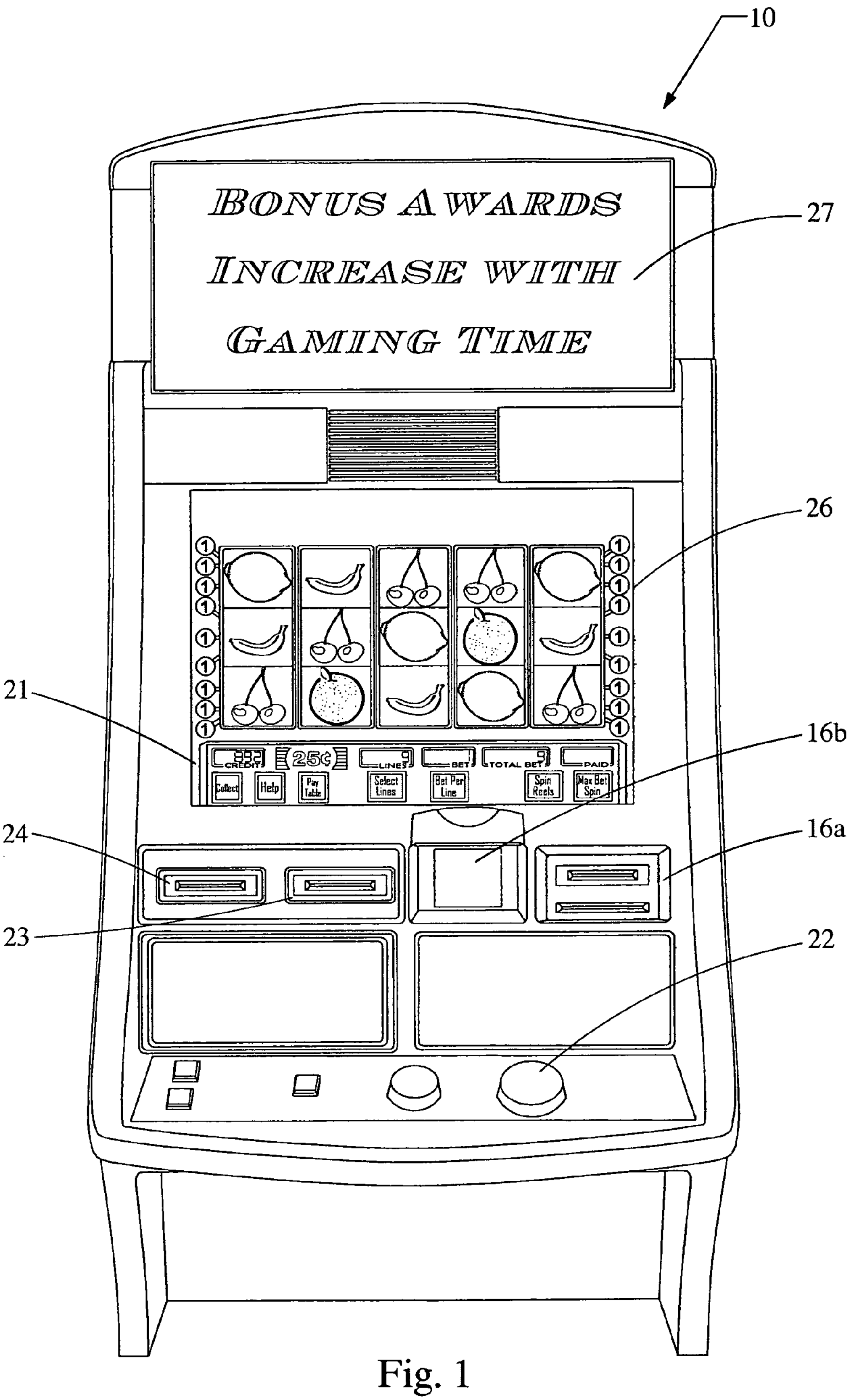
FIG. 1 is a perspective view of a video gaming terminal according to one embodiment of the present invention.

While the invention is susceptible to various modifications and alternative forms, specific embodiments are shown by way of example in the drawings and are described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE ILLUSTRATED EMBODIMENTS

FIG. 1 shows a perspective view of a typical gaming terminal 10 used by gaming establishments, such as casinos. With regard to the present invention, the gaming terminal 10 may be any type of gaming terminal and may have varying structures and methods of operation. For example, the gaming terminal 10 may be a mechanical gaming terminal configured to play mechanical slots, or it may be an electromechanical or electrical gaming terminal configured to play video slots or a video casino game, such as blackjack, slots, keno, poker, etc.

As shown, the gaming terminal 10 includes input devices, such as a wager acceptor 16 (shown as a card wager acceptor 16*a* and a cash wager accepter 16*b*), a touch screen 21, a push-button panel 22, and an information reader 24. For outputs, the gaming terminal 10 includes a payout mechanism 23, a main display 26 for displaying information about the basic wagering game, and a secondary display 27 that may display an electronic version of a pay table, and/or also possibly game-related information or other entertainment features. While these typical components found in the gaming terminal 10 are described below, it should be understood that numerous other elements may exist and may be used in any number of combinations to create various forms of a gaming terminal.

The wager acceptor 16 may be provided in many forms, individually or in combination. The cash wager acceptor 16*a* may include a coin slot acceptor or a note acceptor to input value to the gaming terminal 10. The card wager acceptor 16*b* may include a card-reading device for reading a card that has a recorded monetary value with which it is associated. The card wager acceptor 16*b* may also receive a card that authorizes access to a central account, which can transfer money to the gaming terminal 10.

Also included is the payout mechanism 23, which performs the reverse functions of the wager acceptor. For example, the payout mechanism 23 may include a coin dispenser or a note dispenser to output value from gaming terminal 10. Also, the payout mechanism 23 may also be adapted to receive a card that authorizes the gaming terminal to transfer credits from the gaming terminal 10 to a central account.

The push button panel 22 is typically offered, in addition to the touch screen 21, to provide players with an option on how to make their game selections. Alternatively, the push button panel 22 provides inputs for one aspect of operating the game, while the touch screen 21 allows for inputs needed for another aspect of operating the game.

The outcome of the basic wagering game is displayed to the player on the main display 26. The main display 26 may take the form of a cathode ray tube (CRT), a high resolution LCD, a plasma display, LED, or any other type of video display suitable for use in the gaming terminal 10. As shown, the main display 26 includes the touch screen 21 overlaying the entire monitor (or a portion thereof) to allow players to make game-related selections. Alternatively, the gaming terminal 10 may have a number of mechanical reels to display the game outcome, as well.

In some embodiments, the information reader 24 is a card reader that allows for identification of a player by reading a card with information indicating his or her true identity. Currently, identification is used by casinos for rewarding certain players with complimentary services or special offers. For example, a player may be enrolled in the gaming establishment's players' club and may be awarded certain complimentary services as that player collects points in his or her player-tracking account. The player inserts his or her card into the player-identification card reader 24, which allows the casino's computers to register that player's wagering at the gaming terminal 10. The information reader 24 may also include a keypad (not shown) for entering a personal identification number (PIN). The gaming terminal 10 may require that the player enter their PIN prior to obtaining information. The gaming terminal 10 may use the secondary display 27 for providing the player with information about his or her account or other player-specific information. Also, in some embodiments, the information reader 24 may be used to restore assets that the player achieved during a previous game session and had saved.

Figure 2:
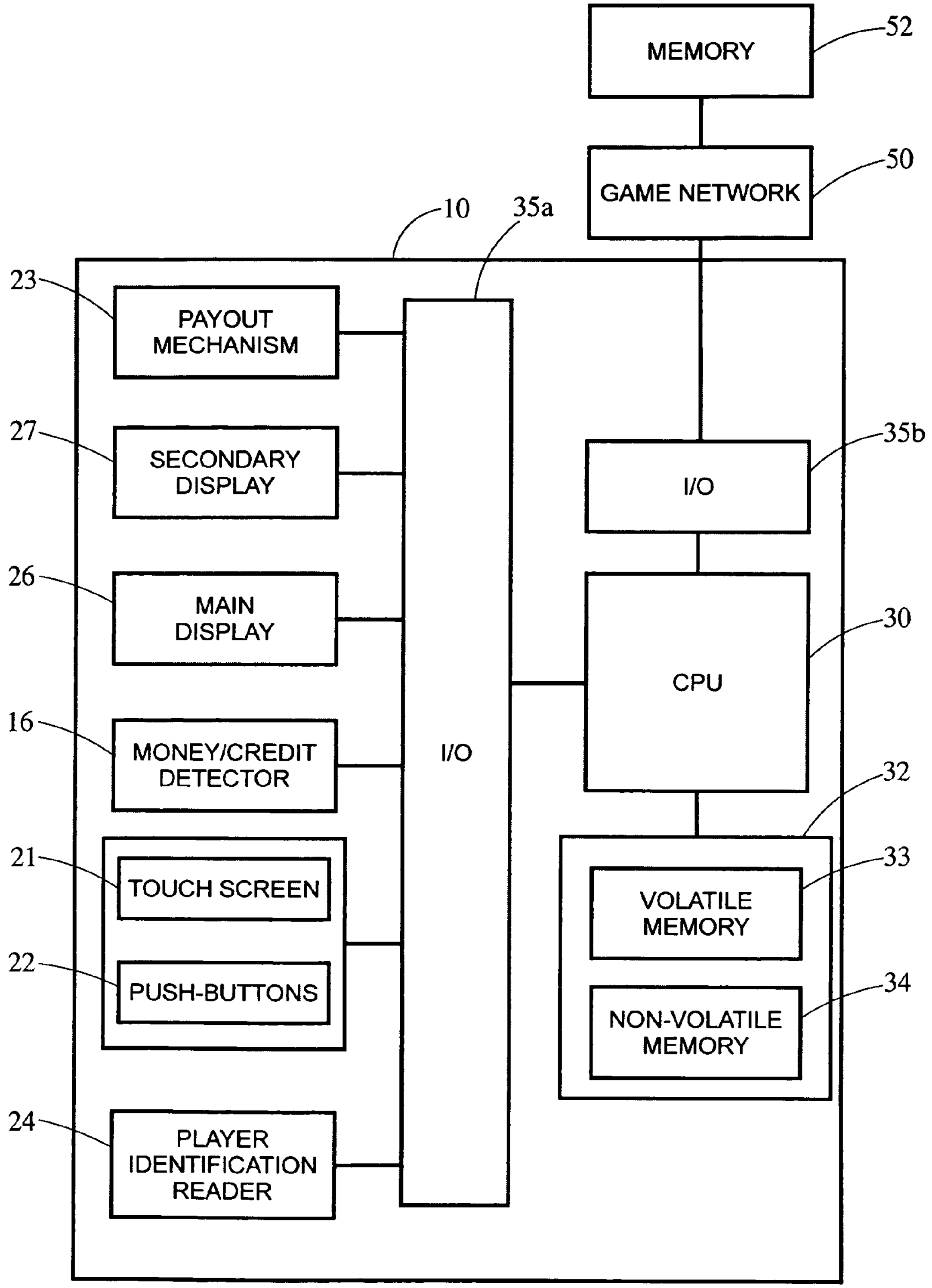
FIG. 2 is a block diagram of the gaming terminal of FIG. 1.

As shown in FIG. 2, the various components of the gaming terminal 10 are controlled by a central processing unit (CPU) 30 (such as a microprocessor or microcontroller). To provide the gaming functions, the CPU 30 executes a game program that allows for the randomly selected outcome. The CPU 30 is also coupled to or includes a local memory 32. The local memory 32 may comprise a volatile memory 33 (e.g., a random-access memory (RAM)) and a non-volatile memory 34 (e.g., an EEPROM). It should be appreciated that the CPU 30 may include one or more microprocessors. Similarly, the local memory 32 may include multiple RAM and multiple program memories.

Communications between the peripheral components of the gaming terminal 10 and the CPU 30 occur through input/output (I/O) circuits 35*a*. As such, the CPU 30 also controls and receives inputs from the peripheral components of the gaming terminal 10. Further, the CPU 30 communicates with external systems via the I/O circuits 35*b*. Although the I/O circuits 35 may be shown as a single block, it should be appreciated that the I/O circuits 35 may include a number of different types of I/O circuits.

In some embodiments, the CPU 30 may not be inside the gaming terminal 10. Instead, the CPU 30 may be part of a game network 50 (FIG. 2) and may be used to control numerous gaming terminals 10. In these embodiments, the CPU 30 will run the basic games for each of the gaming terminals 10, and may also be used to link the gaming terminals 10 together. The game network 50 can include progressive jackpots that are contributed to by all or some of the gaming terminals 10 in the network (e.g., terminal-level jackpots that only each terminal 10 contributes to, bank-level jackpots that are contributed to by all of the terminals 10 in a particular bank, and wide-area jackpots that are contributed to by a larger number of terminals 10, such as multiple banks). Alternatively, the game network 50 can allow the player to retrieve assets obtained while playing one terminal 10 at a different gaming terminal that is also part of the game network. Assets may be any number of things, including, but not limited to, monetary or non-monetary awards, features that a player builds up in a bonus or progressive game to win awards, etc.

In some embodiments, the CPU 30 is also used with the information reader 24 to restore saved assets. For example, in one embodiment, the information reader 24 is adapted to receive and distribute tickets. The tickets each include a unique identifier. The unique identifier links the ticket to a file contained within the local memory 32 or a system memory 52 located in the game network 50. The file includes the assets that are being stored from a previous game. Monetary awards include game credits or money, while the non-monetary awards can be free plays (e.g., free spins), multipliers, or access to bonus and/or progressive games.

When a player inserts a ticket into the information reader 24, the CPU 30 obtains the unique identifier and causes the appropriate memory 32, 52 to be searched, and the file containing the unique identifier matching the identifier on the ticket is retrieved. Any assets or other information contained in this file are then transmitted to the gaming terminal 10, and the player regains any assets that were saved during a previous game. This allows the player to keep assets even after a particular gaming session ends, which increases player commitment to a game and decreases vulturing.

In other embodiments, the information reader 24 may include a card reader, and the unique identifier provided at the gaming terminal 10 may be stored on a personal identification card, such as one described above. Or, the gaming terminal 10 includes a radio frequency identification device (RFID) transceiver or receiver so that an RFID transponder held by the player can be used to provide the unique identifier of the player at the gaming terminal 10 without the need to insert a card into the gaming terminal 10. RFID components can be those available from Pacific Northwest National Laboratory (under the United States Department of Energy) of Richland, Wash.

In other embodiments, the information reader 24 may include a biometric reader, such as a finger, hand, or retina scanner, and the unique identifier may be the scanned biometric information. Additional information regarding biometric scanning, such as fingerprint scanning or hand geometry scanning, is available from International Biometric Group LLC of New York, N.Y. Other biometric identification techniques can be used as well for providing a unique identifier of the player. For example, a microphone can be used in a biometric identification device on the gaming terminal so that the player can be recognized using a voice recognition system.

In summary, there are many techniques in which to provide a unique identifier for the player so that the assets accumulated by the player during one wagering session can be stored in either the system or local memory 52, 32, thereby allowing the player to subsequently access those assets at the same gaming terminal 10 or a different gaming terminal within the network 50. As described below with reference to FIGS. 3A to 7, various assets related to the wagering game features and formats can be stored after one gaming session and used in a subsequent gaming session(s) to enhance the gaming experience for the player.

To provide a more entertaining and exciting gaming experience, a math feature of a gaming terminal is changed according to different embodiments of the present invention. The change in the math feature can be based on one or more of a plurality of game-play characteristics, such as a plurality of previous gaming sessions, elapsed time, a plurality of previous games, previously wagered credits, increased game-play, previous outcomes, and player selection. As described below, the math feature can be selected, for example, from one or more of a plurality of math features such as a volatility feature, a payback percentage feature, a higher-paying symbol feature, a payback feature, a progressive trigger feature, a game-symbol feature, a hit frequency feature, a bonus frequency feature, and a winning combination feature.

Figure 3B:
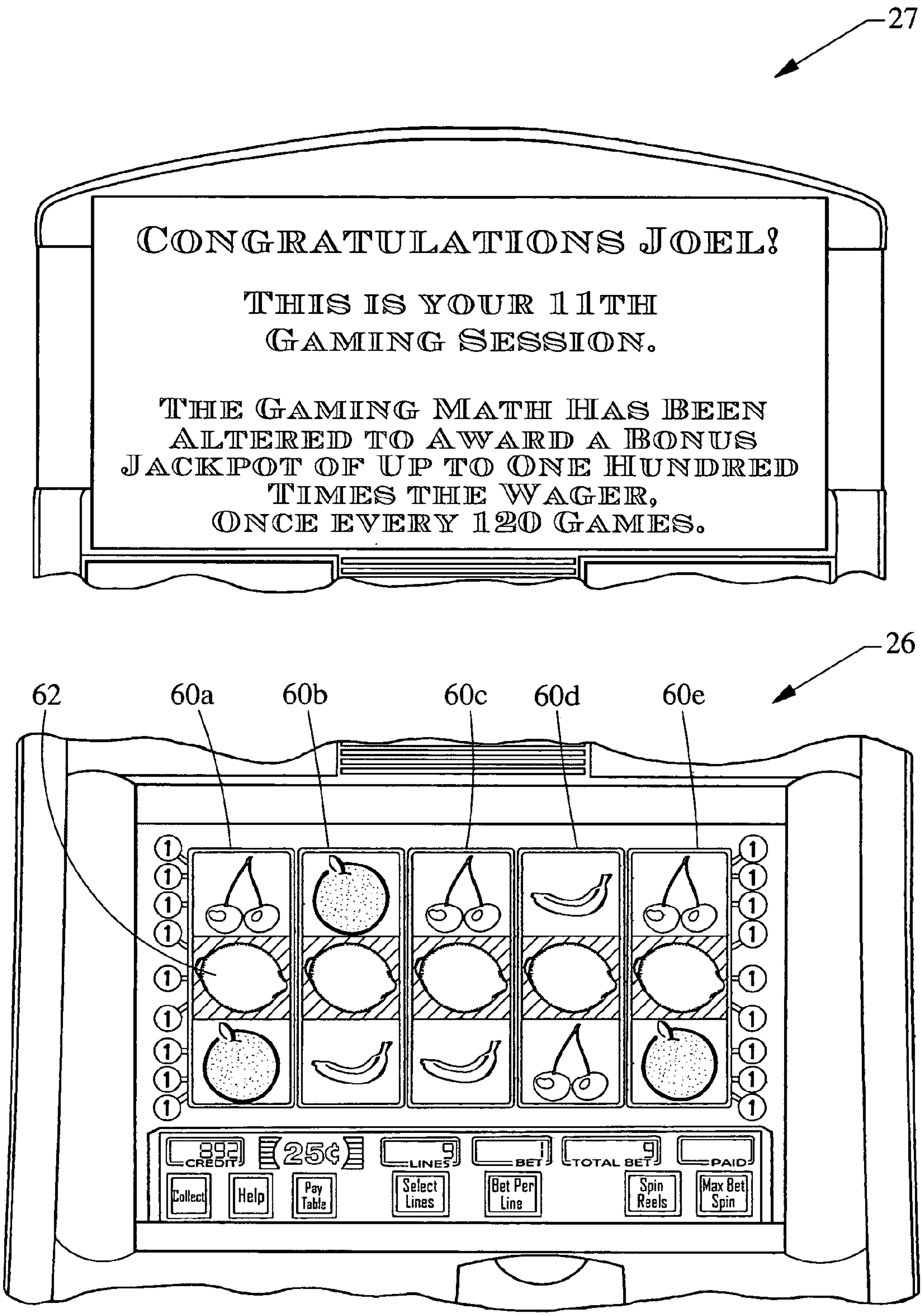
FIG. 3B is a representation of a display indicating a change in a gaming math feature, according to an alternative embodiment of the present invention.

Referring to FIGS. 3A and 3B, a math feature can be a game volatility that changes based on elapsed time. The player starts by playing a low volatility game, which features frequent basegame pays, or awards, and bonus rounds. Both the basegame and the bonus rounds pay relatively small awards. Over time, the game volatility increases, wherein the awards and the bonus rounds become less frequent but the size of the awards increases. Thus, this math feature entices the player to sit and play initially because the frequency of the awards and the bonus rounds is high, and then maintains the player's interest by increasing the game awards.

For example, as shown in FIG. 3A, during the first 5 gaming sessions the award provided as a basegame pay is 2-3 times the amount of the wager, with an occurrence of once every 10 games. The basegame pay is generally awarded only during a base wagering game. In contrast, during gaming sessions 11-20, the award has been increased to 5-7 times the amount of the wager, but the frequency has been decreased to once every 20 games. Similarly, during the first 5 gaming sessions the award provided in a bonus round is 7-10 times the amount of the wager, with an occurrence of once every 30 games. In contrast, during gaming sessions 11-20, the bonus award has been increased to 7-100 times the amount of the wager, but the frequency has been decreased to once every 120 games. Thus, as the player spends more time on a game, the game volatility changes from a low volatility to a high volatility.

The change in gaming volatility can be indicated on the secondary display 27 of the gaming terminal 10. As shown in FIG. 3B, the primary display 26 of the gaming terminal 10 includes a plurality of reels 60*a*-60*e*. A plurality of reel symbols 62 are displayed in the reels 60*a*-60*e*. Player "Joel" is being congratulated for reaching his "11th Gaming Session," and is notified that "The Gaming Math Has Been Altered To Award A Bonus Jackpot Of Up To One Hundred Times The Wager, Once Every 120 Games." Optionally, the background of the reel symbols 62 is altered to indicate that the math feature has changed. Optionally, the game may not indicate that the math feature has changed. Further, the math change can be immediate, e.g., it can occur exactly when the 11th gaming session begins, or it can occur in gradual steps, e.g., it can occur somewhere between the 11th gaming session and the 20th gaming session.

Figure 4B:
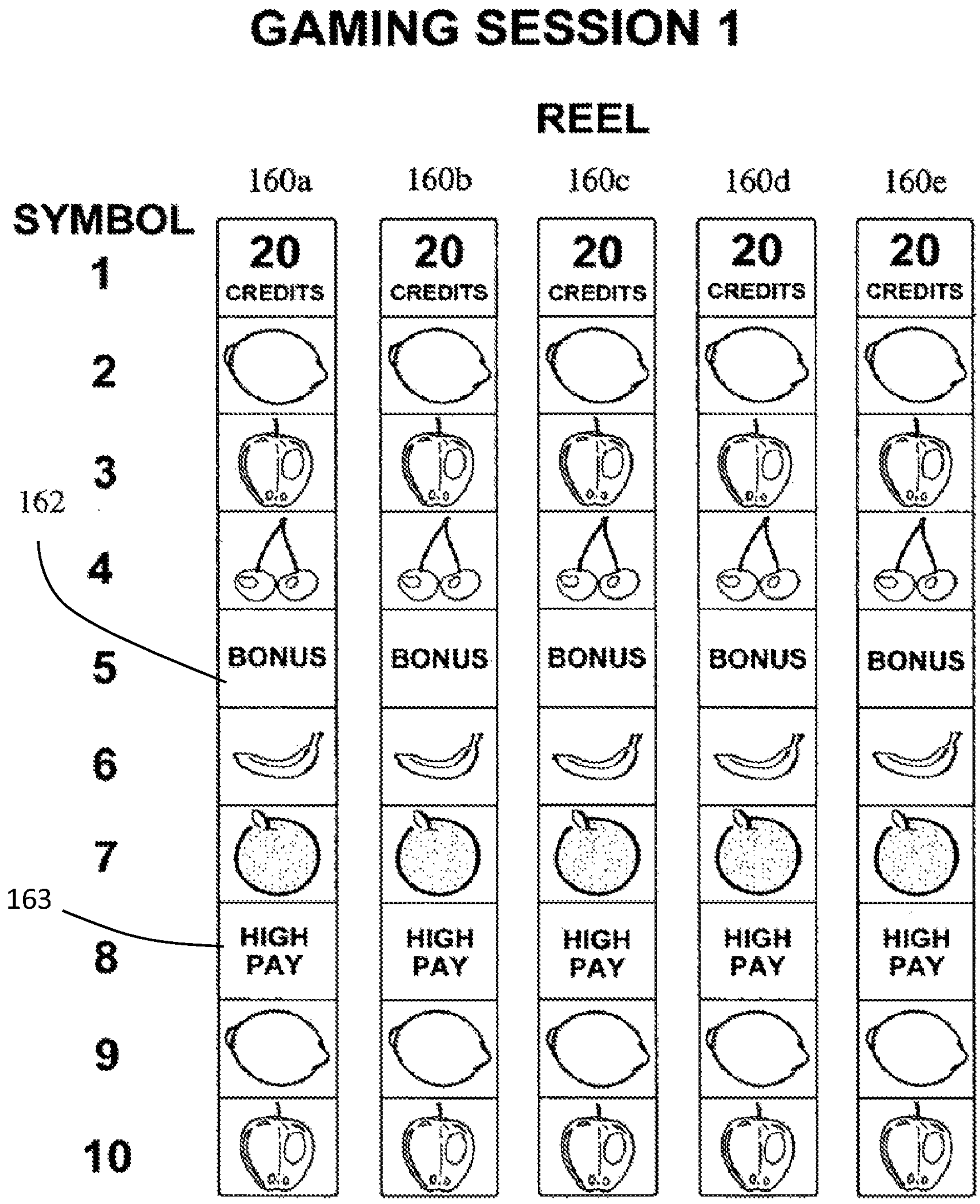
FIG. 4B is a representation of a plurality of reels shown in a gaming session, according to an alternative embodiment of the present invention.

Referring now to FIGS. 4A-4D, a gaming math feature is a payback percentage feature that is adjusted over time. In this embodiment, the payback percentage to the player is increased over time. For example, as shown in the table of FIG. 4A, during the first 5 gaming sessions of the player the payback percentage is 86%. During gaming sessions 6-10, the payback percentage has increased to 88%, during gaming sessions 11-20, the payback percentage has increased to 90%, and during gaming sessions 21-40, the payback percentage has reached an upper limit of 94%. Increasing the payback percentage provides the player with an incentive to continue playing additional gaming sessions.

Other alternative embodiments can be used in addition or instead of altering the payback percentage of a game. For example, the payback amount and the payback frequency can also be changed. As the exemplary table shows in FIG. 4A, the payback amount can be increased from 20 credits, in wagering sessions 1-5, to 50 credits, in wagering sessions 21-40. Similarly, the payback frequency can be increased from 35%, in wagering sessions 1-5, to 50%, in wagering sessions 21-40.

Figure 4C:
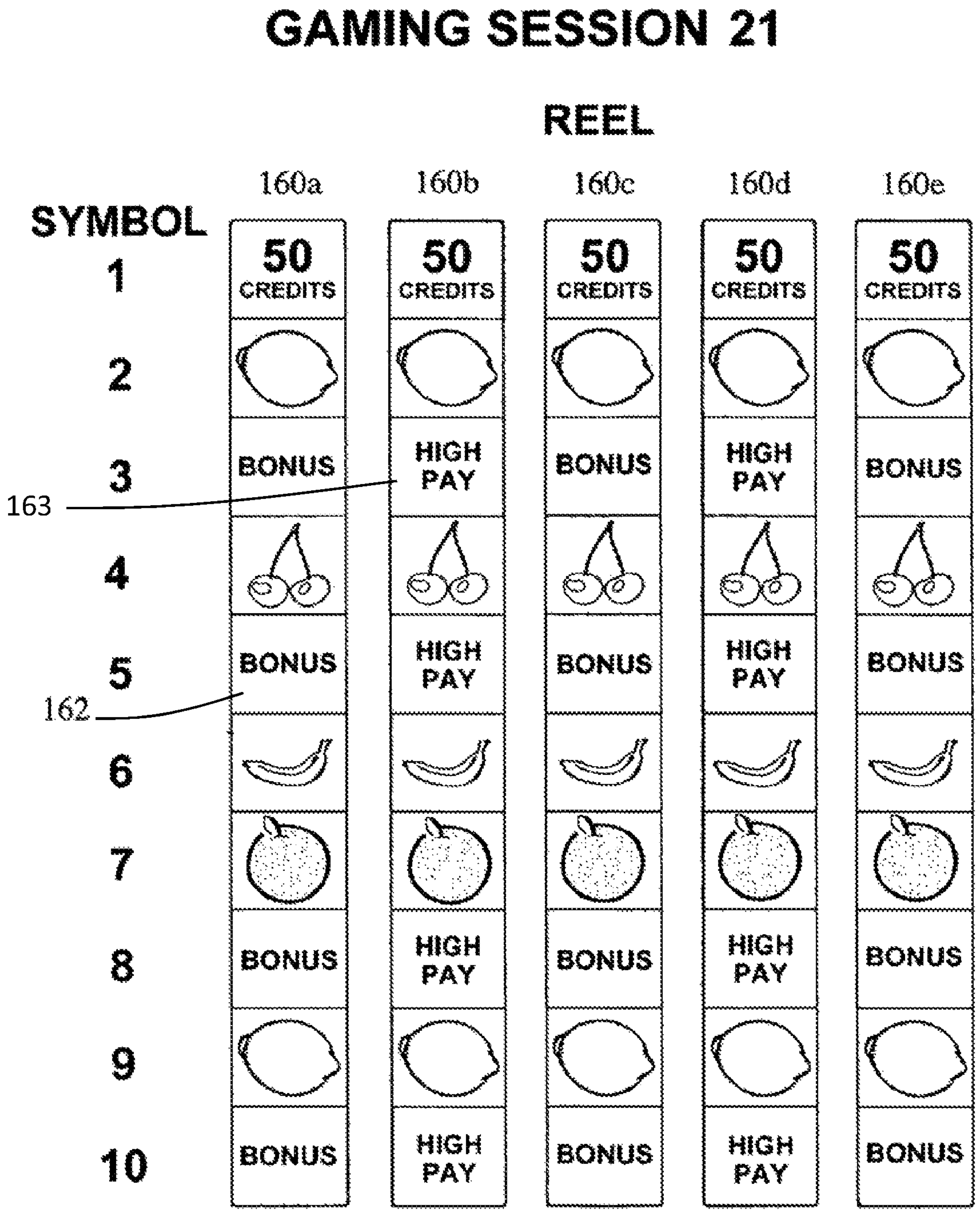
FIG. 4C is a representation of the plurality of reels of FIG. 4B shown in another gaming session, according to an alternative embodiment of the present invention.

Alternatively, higher paying symbols and/or bonus reel symbols may be added to one or more of a plurality of reels 160*a*-160*e* to increase the credited award. A higher paying symbol 163, such as the "HIGH PAY" symbol shown in FIGS. 4B and 4C, is a symbol used for determining whether a higher-than-normal award is awarded if a winning combination is obtained. A bonus reel symbol 162, such as the "BONUS" symbol shown in FIGS. 4B and 4C, is a symbol used for determining whether a bonus game is awarded. The table shown in FIG. 4A indicates, for example, that one higher paying symbol is included on a reel for gaming sessions 1-5, two higher paying symbols are included on a reel for gaming sessions 6-10, three higher paying symbols are included for gaming sessions 11-20, and four higher paying symbols are included for gaming sessions 21-40. Similarly, it is indicated that one bonus reel symbol is included on a reel for gaming sessions 1-5, and, progressively, the bonus reel symbols increase by one as the gaming sessions increase, reaching four bonus reel symbols during gaming sessions 21-40.

To better exemplify the math feature changes that are noted in the table of FIG. 4A, the reels 160*a*-160*e* have been displayed to show changes occurring for gaming session 21, as compared to gaming session 1. In gaming session 1 a single higher paying symbol, the "HIGH PAY" symbol, and a single bonus reel symbol, the "BONUS" symbol, is displayed in each one of the reels 160*a*-160*b*. In gaming session 21, four higher paying symbols are displayed in reels 160*b* and 160*d*, and four bonus reel symbols are displayed in each one of the reels 160*a*, 160*c*, and 160*e*. The higher paying symbols and the bonus reel symbols can be distributed in the reels 160*a*-160*e* in other various ways, such as having higher paying symbols in all five of the reels 160*a*-160*e*, having bonus reel symbols in all five of the reels 160*a*-160*e*, etc.

Figure 4D:
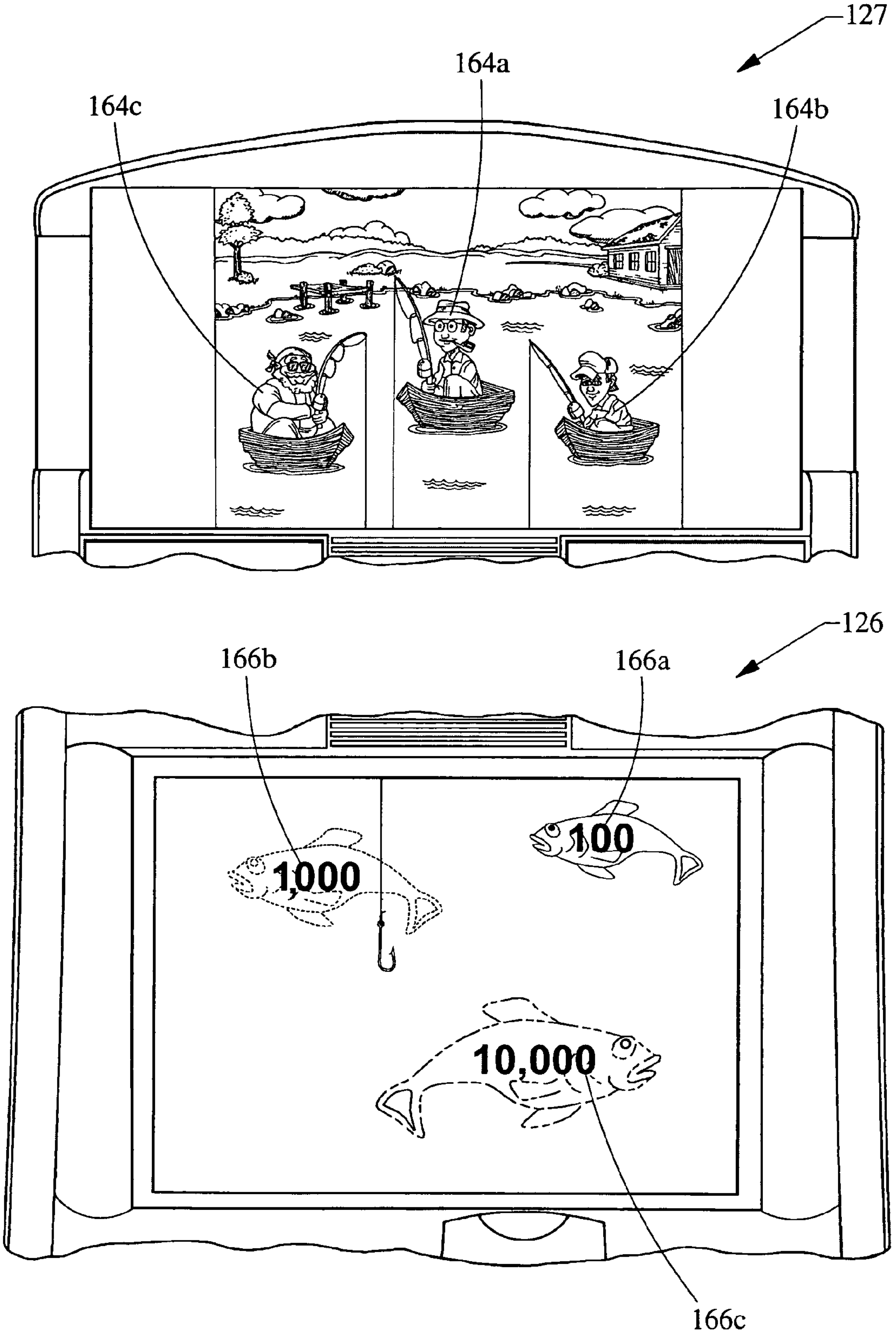
FIG. 4D is a representation of a bonus game, according to an alternative embodiment of the present invention.

To illustrate the change in payback amount, FIG. 4D displays a main display 126 including fish symbols 166*a*-166*c*, which represents a bonus award, and a secondary display 127, which includes three fishermen 164*a*-164*c*. Initially, the fish symbol 166*a* represents a small payback amount, i.e., 100 credits. Over time, the math feature changes and the fish symbol 166*b* reflects the change in the payback amount from 100 credits to 1,000 credits. As the player continues his or her wagering sessions, the fish symbol 166*c* has now grown to represent 10,000 credits. During the game, the player selects one of the three fishermen 164*a*-164*c* and attempts to lure the fish 166. Depending on the value of the current payback amount, the player may be fishing for as little as 100 credits, or as much as 10,000 credits. The change in math can be indicated to the player, or can be obscured from the player.

Figure 5:
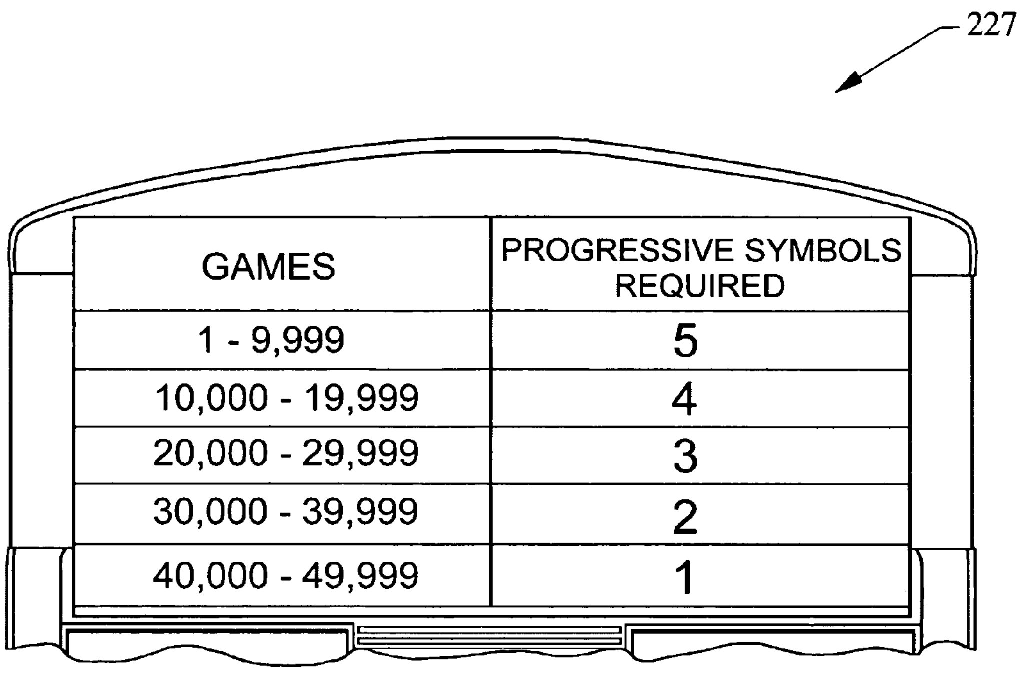
FIG. 5 is a representation of a display showing requirements for winning a progressive award, according to an alternative embodiment of the present invention.

Referring now to FIG. 5, a gaming math feature is a progressive trigger feature, which changes the requirements necessary for winning a progressive jackpot. A secondary display 227 includes a table that indicates how many progressive symbols are required for winning the progressive jackpot. For example, for games 1-9,999, five progressive symbols are required. As the player continues to play and logs additional games, the number of progressive symbols is decreased to make it easier for the player to win the progressive jackpot. Thus, for games 40,000-49,000, only a single progressive symbol is required. Each player can have his or her own personal progressive jackpot. Alternatively, a plurality of players can share a single progressive jackpot. Optionally, the progressive feature can change to automatically award a progressive jackpot when the player reaches a predetermined game number. For example, when the player reaches game 50,000, then no additional progressive symbols are required and the player is awarded the progressive jackpot as a reward for the number of games that the player has accumulated over a plurality of wagering sessions.

Figure 6A:
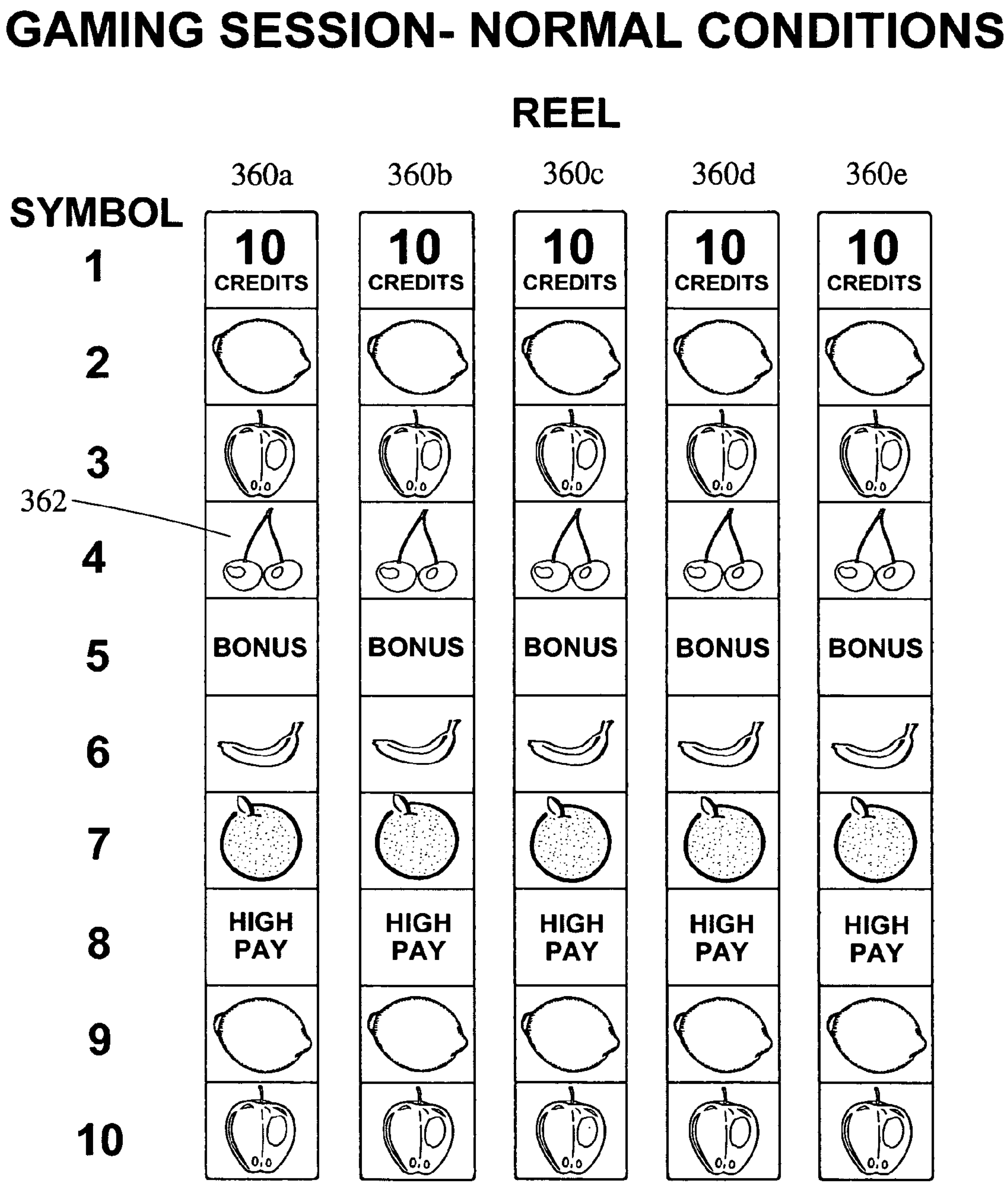
FIG. 6A is a representation of a plurality of reels shown for a normal condition, according to an alternative embodiment of the present invention.
Figure 6B:
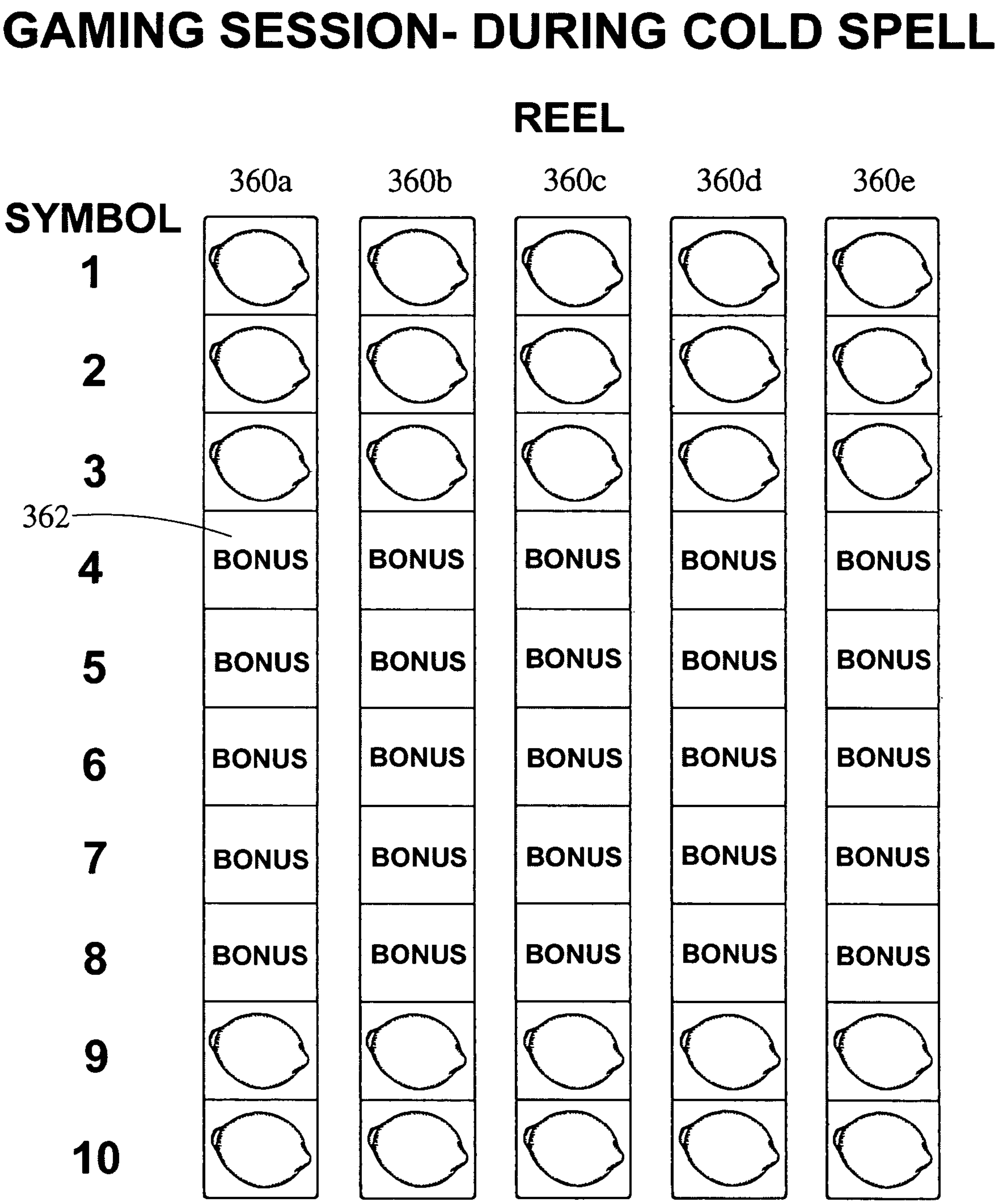
FIG. 6B is a representation of the plurality of reels of FIG. 6A shown for a cold spell condition, according to an alternative embodiment of the present invention.

Referring to FIGS. 6A and 6B, a gaming math feature is a game-symbol feature that changes based on previous gaming outcomes of the player. For example, if the player has been in a "cold spell," wherein the player has had none or minimal winnings over a period of time, a plurality of reel strips 360*a*-360*e* would temporarily change to high-hit frequency reels. Similarly, if the player has not won any bonus game for a predetermined period of time, then the reel strips 360*a*-360*e* would temporarily change to high-bonus frequency reels. After the player is awarded one or more awards and/or bonus games, then the reel strips 360*a*-360*e* would return to normal. During the period of time when the reel strips 360*a*-360*e* have changed from normal conditions, the game may go into an over 100% payback condition.

In another embodiment, the gaming math feature would keep the same payback percentage but would simply change the balance of different pays. For example, the hit frequency may be increased at the expense of the bonus frequency, or at the expense of higher paying winning combinations.

As shown in FIG. 6A, the five reels 360*a*-360*e* are displayed under normal conditions. Each one of the reels 360*a*-360*e* includes ten symbols 362, e.g., a 10 Credits symbol, two lemon symbols, two apple symbols, one cherry symbol, one Bonus symbol, one banana symbol, an orange symbol, and a High Pay symbol. If during a particular gaming session the player has hit a "Cold Spell," then, as shown in FIG. 6B, the reels 360*a*-360*e* change to accommodate the player's temporary setback. Accordingly, each one of the reels 360*a*-360*e* has been temporarily changed to include five lemon symbols and five bonus symbols. Thus, the odds of the player either winning a winning combination, based on the lemon symbols, have been greatly increased.

Figure 7:
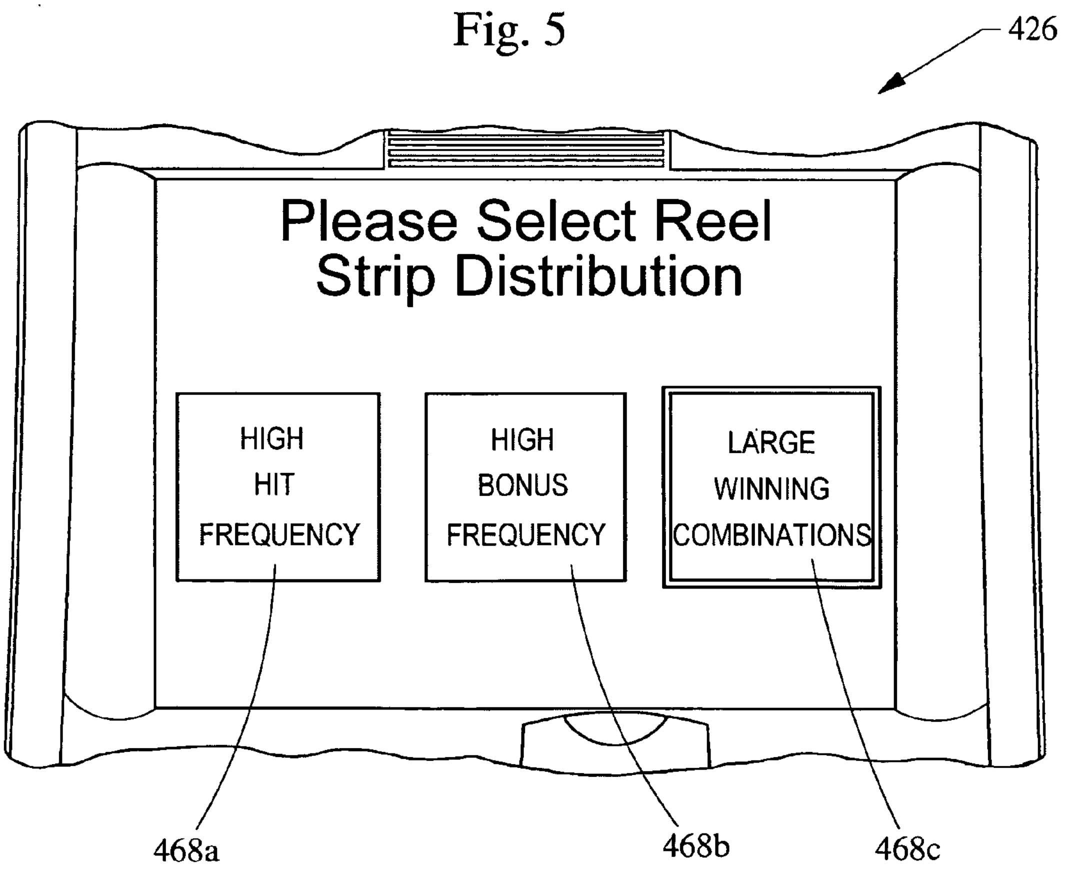
FIG. 7 is a representation of a main display indicating to a player to select a choice for a gaming math feature, according to an alternative embodiment of the present invention.

Referring now to FIG. 7, a main display 426 includes a plurality of player selections 468*a*-468*c*. In this embodiment, a gaming math feature is an enhanced reel feature, wherein the reels are changed according to a player choice. Specifically, the player chooses the type of reel strip distribution from a "high hit frequency" selection 468*a*, a "high bonus frequency" selection 468*b*, and a "large winning combinations" selection 468*c*. Optionally, the player can pay extra for a certain amount of spins with the enhanced reels. Alternatively, the player can choose to give up one type of pay for another, e.g., the player may give up a hit frequency pay for a bonus frequency pay.

In alternative embodiments, a player can use a telephone to access and use one or more of the player's accumulated game assets. For example, using a mobile phone, the player can dial a toll-free phone number to access his or her game assets. A central server associated with the network 50 (FIG. 2) can recognize the player's mobile number for identification purposes, via a caller-id feature, or, alternatively, the central server may require the player to create a unique code number (if, for example, the player uses a caller-id block feature). Optionally, the player may be required to enter an additional code for identifying a specific gaming machine 10.

Thus, the player can use his or her mobile phone to remotely access the wagering game and utilize the accumulated assets at a time and place according to the player's desire. For example, the player can restart a gaming session via the mobile phone at a point where he or she had previously stopped the session, or the player can choose, via the mobile phone, to play an accumulated bonus game that he or she had previously won, but not played.

In another example, the player can put money into a gaming machine 10 while the player is physically at the gaming machine 10. Before the player walks away from the gaming machine 10, the player can register the gaming machine 10 to the player's phone. The player can also let the gaming machine 10 know what assets it may intend to use in the future via remote access by the phone. For example, the player can register the phone number as a password required to access the player's assets on the gaming machine 10. The player can initiate an auto-play feature while at the gaming machine 10 or remotely via the phone. The auto-play feature of the gaming machine 10 is configured to report, e.g., via still or moving images on the phone, one or more of the gaming outcomes. Then, at a later time, the player returns to the gaming machine 10, re-checks into the gaming machine via the phone and, optionally, cashes out any winnings. While no actual gameplay occurs on the phone, the phone is used for accessing the player's assets and gaming outcomes on the gaming machine 10.

Optionally, the wagering game provides the player with access to accumulated assets and/or certain awards only if the player achieves a "Remote Play Winning Outcome." If the player achieves this outcome (e.g., in a basic or bonus game), then he or she is allowed remote access to one or more of the accumulated assets and/or certain awards. For example, if the player achieves the "Remote Play Winning Outcome," the player can have the option to select a smaller award while the player is physically present at the gaming machine 10 or a larger award if the player uses the telephone. In another example, the player may be given the option to play for smaller awards while the player is physically present at the gaming machine 10 or for larger awards if the player uses the telephone for gameplay initiation.

Alternative to using a voice telephone call to initiate a game or to access assets and/or awards, as described above, the player can send a text message. For example, the player can send a special code in the text message to log-in using a special number on the gaming machine 10.

For identification purposes, various verification ways can be used. For example, the player can enter the mobile telephone number into the gaming machine 10 as a player identification number. When the phone is near, the gaming machine 10 can detect it and verify the player identification number, e.g., the mobile number. For example, a receiver can be installed in the gaming machine 10 for detecting a mobile identifier (which may include the mobile number) that is periodically transmitted by mobile phones to the nearest mobile base station. Thus, the gaming machine 10 would have similar capabilities to the mobile base station.

Alternatively, the gaming machine 10 can send a voice or text message to the mobile telephone to verify the player's identification number. For example, the gaming machine 10 can send a text message asking the player to reply to the text message using a predetermined code for confirmation purposes. Optionally, a Bluetooth identifier can be used for logging-in and/or verification purposes, wherein the Bluetooth identifier is unique per phone and/or service carrier.

Special benefits can be offered to a player based on the telephone brand and/or service carrier. For example, predetermined assets can be made available to the player only if they use a telephone of brand X that uses service carrier Y. Optionally, the special benefits can be made available based on the telephone model.

While the invention is susceptible to various modifications and alternative forms, specific embodiments thereof have been shown by way of example in the drawings and herein described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

What is claimed is:

1. A computer-implemented method of conducting a wagering game on a gaming system, said wagering game including randomly selecting an outcome of a plurality of outcomes, wherein said selecting is determined according to a gaming volatility math feature of said wagering game, said method comprising:

detecting, by a wager acceptor, a physical item associated with monetary value that is transmitted to said gaming system;

receiving, via at least one input device of said gaming system, one or more wager inputs indicating one or more wagers from a player to initiate a current gaming session of said wagering game;

accessing, via at least one of one or more processors, stored game data associated with said player, said game data representing one or more wagers and one or more outcomes occurring during game-play of said wagering game in a previous gaming session in which said gaming volatility math feature was at a first volatility;

altering, via at least one of said one or more processors, said gaming volatility math feature from said first volatility to a higher volatility for said current gaming session in direct response to said game data indicating that said game-play exceeds a designated threshold; and selecting, via at least one of said one or more processors, at least one randomly-selected outcome in accordance with said gaming volatility math feature of said wagering game at said higher volatility.

2. The method of claim 1, further comprising selecting and altering a gaming math feature from a group consisting of a payback percentage feature, a higher-paying symbol feature, a payback feature, a progressive trigger feature, a game-symbol feature, a hit frequency feature, a bonus frequency feature, and a winning combination feature.

3. The method of claim 1, wherein said first volatility corresponds to frequent pays in a base game of said wagering game and frequent bonus rounds of a bonus game of said wagering game, and said higher volatility corresponds to large pays in said base game and said bonus game.

4. The method of claim 1, wherein said gaming volatility math feature is altered from a first volatility to a higher volatility based on said game data indicating a number of previous gaming sessions of said wagering game in excess of a predetermined threshold number.

5. A gaming system configured to alter volatility of a wagering game, said system comprising:

one or more input devices including a wager acceptor configured to detect a physical item associated with monetary value that is transmitted into said gaming system;

one or more display devices for displaying a randomly-selected outcome of a plurality of outcomes in response to receiving a wager input indicating a wager from a player to play said wagering game, said randomly-selected outcome being determined in accordance with a gaming volatility math feature of said wagering game;

one or more processors; and at least one memory device storing instructions that, when executed by at least one of said one or more processors, cause said gaming system to:

receive one or more wager inputs indicating one or more wagers from a player to initiate a current gaming session of said wagering game;

access stored game data associated with said player, said game data representing said wagers and said outcomes that occur during game-play of said wagering game in a previous gaming session in which said gaming volatility math feature was at a first volatility;

alter said gaming volatility math feature from said first volatility to a higher volatility for said current gaming session in direct response to said game data indicating that said game-play exceeds a designated threshold; and select at least one randomly selected outcome in accordance with said gaming volatility math feature of said wagering game at said higher volatility.

6. The gaming system of claim 5, further comprising a gaming terminal, at least one of said one or more display devices being located within said gaming terminal, wherein said at least one display device shows a text message explaining that said gaming volatility math feature has been altered.

7. The gaming system of claim 5, wherein said instructions further cause said gaming system to highlight a plurality of symbols on at least one of said one or more display devices to indicate that said gaming volatility math feature has been altered.

8. The gaming system of claim 5, wherein said instructions further cause said gaming system to store said game data on at least one of a player ticket, a player card, and said at least one memory device.

9. The gaming system of claim 5, further comprising a gaming terminal, wherein at least one of said one or more display devices, at least one of said one or more processors, and at least one of said at least one memory device are located in said gaming terminal.

10. The gaming system of claim 5, further comprising a gaming terminal, wherein at least one of said one or more display devices is located in said gaming terminal, and at least one of said one or more processors and at least one of said at least one memory device are located outside said gaming terminal.

11. A computer-implemented method of conducting a wagering game on a gaming system, said wagering game including randomly selecting an outcome of a plurality of outcomes, wherein said selecting is determined according to a gaming volatility math feature of said wagering game, said method comprising:

detecting, by a wager acceptor, a physical item associated with monetary value that is transmitted into said gaming system;

receiving, via at least one input device of said gaming system, one or more wager inputs indicating one or more wagers from a player to initiate a first gaming session of said wagering game, said gaming volatility math feature being at a first volatility during said first gaming session;

in response to receiving said one or more wager inputs, selecting, via at least one of one or more processors, at least one randomly-selected outcome from said plurality of outcomes;

collecting, via at least one of said one or more processors and during said first gaming session, historical data representing said one or more wagers and said at least one outcome;

saving, on at least one memory device and prior to a second gaming session, a data set including said historical data;

restoring said data set in said second gaming session; and altering, in said second gaming session and in direct response to said historical data indicating that gameplay in said first gaming session exceeds a designated threshold, said gaming volatility math feature from a first volatility to a higher volatility.

12. The method of claim 11, wherein said altering includes altering said gaming volatility math feature from said first volatility to said higher volatility based on said historical data indicating a number of games played during said previous gaming session that exceeds a predetermined threshold number.

13. The method of claim 11, further comprising selecting and altering a gaming math feature from a group consisting of a payback percentage feature, a higher-paying symbol feature, a payback feature, a progressive trigger feature, a game-symbol feature, a hit frequency feature, a bonus frequency feature, and a winning combination feature.

* * * * *